United States Patent
Arnst et al.

(10) Patent No.: US 11,492,277 B2
(45) Date of Patent: Nov. 8, 2022

(54) HEAVY AMINE NEUTRALIZING AGENTS FOR OLEFIN OR STYRENE PRODUCTION

(71) Applicant: Ecolab USA Inc., St. Paul, MN (US)

(72) Inventors: Theodore C. Arnst, Sugar Land, TX (US); Neetu Tomar, Haryana (IN)

(73) Assignee: Ecolab USA Inc., St. Paul, MN (US)

( * ) Notice: Subject to any disclaimer, the term of this patent is extended or adjusted under 35 U.S.C. 154(b) by 610 days.

(21) Appl. No.: 15/222,404

(22) Filed: Jul. 28, 2016

(65) Prior Publication Data
US 2017/0029301 A1   Feb. 2, 2017

Related U.S. Application Data

(60) Provisional application No. 62/198,497, filed on Jul. 29, 2015.

(51) Int. Cl.
| | |
|---|---|
| C02F 1/66 | (2006.01) |
| C23F 15/00 | (2006.01) |
| C10G 9/16 | (2006.01) |
| C10G 9/36 | (2006.01) |
| C10G 75/04 | (2006.01) |
| C10G 75/02 | (2006.01) |
| C23F 14/02 | (2006.01) |
| C02F 1/68 | (2006.01) |
| C02F 103/36 | (2006.01) |

(52) U.S. Cl.
CPC .................. *C02F 1/66* (2013.01); *C10G 9/16* (2013.01); *C10G 9/36* (2013.01); *C10G 75/02* (2013.01); *C10G 75/04* (2013.01); *C23F 14/02* (2013.01); *C23F 15/00* (2013.01); *C02F 1/68* (2013.01); *C02F 2103/365* (2013.01); *C02F 2303/08* (2013.01)

(58) Field of Classification Search
CPC ......................................................... C02F 1/66
USPC .............................................................. 422/7
See application file for complete search history.

(56) References Cited

U.S. PATENT DOCUMENTS

| | | | |
|---|---|---|---|
| 1,062,764 A | 12/1977 | White et al. | |
| 1,217,216 A | 8/1980 | Lipinski | |
| 1,229,284 A | 10/1980 | White et al. | |
| 4,542,253 A * | 9/1985 | Kaplan | ............ C07C 4/02 208/47 |

(Continued)

FOREIGN PATENT DOCUMENTS

| | | |
|---|---|---|
| JP | S6315886 A | 1/1988 |
| JP | 2004211050 | 7/2004 |

(Continued)

OTHER PUBLICATIONS

Annand et al., "Inhibition of acid corrosion by soluble monomer and polymer amines containing identical functional groups," 1965, Journal of the Electrochemical Society, 112 (2), pp. 144-148 (Year: 1965).*

(Continued)

*Primary Examiner* — Holly Kipouros
(74) *Attorney, Agent, or Firm* — Stinson LLP (57) ABSTRACT

The present invention generally relates to compositions and methods for neutralizing acidic streams in an olefin or styrene production plant. More specifically, the invention relates to neutralizing agents for dilution steam systems in the steam cracker process and their use for reducing acid corrosion and fouling in such systems.

10 Claims, 3 Drawing Sheets

(56) References Cited

U.S. PATENT DOCUMENTS

| | | | |
|---|---|---|---|
| 4,594,147 A | 6/1986 | Roof et al. | |
| 4,600,518 A | 7/1986 | Ries et al. | |
| 4,686,002 A | 8/1987 | Tasset | |
| 1,806,229 A | 2/1989 | Ferguson et al. | |
| 1,992,210 A | 2/1991 | Naeger et al. | |
| 5,008,039 A * | 4/1991 | Woodward | C10M 129/02 252/392 |
| 5,091,108 A | 2/1992 | Harder et al. | |
| 5,114,566 A | 5/1992 | Naeger et al. | |
| 5,120,356 A | 6/1992 | Phillips et al. | |
| 5,167,835 A * | 12/1992 | Harder | C02F 1/20 210/750 |
| 5,173,213 A | 12/1992 | Miller et al. | |
| 5,209,858 A | 5/1993 | Heinsohn et al. | |
| 5,211,840 A | 5/1993 | Lehrer et al. | |
| 5,283,006 A | 2/1994 | Lehrer et al. | |
| 5,326,482 A | 7/1994 | Lessard et al. | |
| 5,556,575 A | 9/1996 | Babaian-Kibala et al. | |
| 5,714,664 A | 2/1998 | Fearnside et al. | |
| 5,965,785 A * | 10/1999 | Braden | C10G 7/10 208/184 |
| 6,017,399 A | 1/2000 | Fellers, Sr. et al. | |
| 6,350,395 B1 | 2/2002 | Kuemin | |
| 7,125,483 B2 | 10/2006 | Haynal | |
| 7,135,445 B2 | 11/2006 | Charm et al. | |
| 7,279,089 B2 | 10/2007 | Vercammen | |
| 7,381,319 B2 | 6/2008 | Lack et al. | |
| 8,025,774 B2 | 9/2011 | McCoy et al. | |
| 8,277,639 B2 | 10/2012 | Buchanan et al. | |
| 9,297,081 B2 | 3/2016 | Arnst et al. | |
| 2004/0238405 A1 | 12/2004 | Vercammen | |
| 2004/0267069 A1* | 12/2004 | Ding | B01J 8/025 585/638 |
| 2005/0051462 A1 | 3/2005 | Lack et al. | |
| 2006/0043340 A1 | 3/2006 | Koizumi et al. | |
| 2012/0279522 A1 | 11/2012 | Varrin, Jr. et al. | |
| 2014/0248781 A1* | 9/2014 | Gemmill | C11D 3/0073 438/746 |
| 2014/0343332 A1 | 11/2014 | Pou et al. | |
| 2014/0361217 A1 | 12/2014 | Moonen et al. | |
| 2015/0376040 A1* | 12/2015 | Metzler | C02F 1/66 252/180 |
| 2016/0130500 A1 | 5/2016 | Chen et al. | |
| 2017/0036979 A1* | 2/2017 | Jiang | C07C 37/86 |

FOREIGN PATENT DOCUMENTS

| | | |
|---|---|---|
| JP | 2007078291 A | 3/2007 |
| KR | 10-2013-0131796 | 12/2013 |
| WO | 2004/044266 A1 | 5/2004 |
| WO | 2013/077855 A1 | 5/2013 |
| WO | 2013/154968 A1 | 10/2013 |

OTHER PUBLICATIONS

Metzler et al., "Avoid problems in process water systems," Chemical Engineering Progress, 103 (10), pp. 54-60, 112 (2), pp. 144-148 (Year: 2007).*

Extended European Search Report relating to European Patent Application No. 15752158.4 dated Oct. 4, 2017, 6 pages.

International Search Report and Written Opinion dated Nov. 7, 2016 relating to PCT Patent Application No. PCT/US2016/044373, 11 pages.

Extended European Search Report dated Feb. 18, 2019 relating to European Patent Application No. 16831328.6, 7 pages.

Clayton, J.F., Tramp ions degrade high-nickel alloys, Canadian Chemical Processing, Jun. 1977, 2 pages.

Hood, David et al., AIChE Paper No. 51c, Minor Components, Major Issues: An Overview of Contaminants in Ethylene Plants, 2007 Spring National Meeting, Houston, Texas, Apr. 24, 2007, 39 pages.

Hussain, Mahmoud Sh. et al., Anticorrosive properties of polyamide on thecarbon steel. Journal of Basrah Researches ((Sciences)) vol. 40, No. 2 (2014), pp. 146-153.

Kuznetsov, Yu I. et al., Aminophosphonate Corrosion Inhibitors for Steel (Abstract Only), Protection of Metals, vol. 39, Issue 2, Mar. 2003, 3 pages.

Laamari, M.R. et al., Adsorption and corrosion inhibition of carbon steel in hydrochloric acid medium by hexamethylenediamine tetra (methylene phosphonic acid), Arabian Journal of Chemistry (2011), 7 pages.

Parks, S.B. et al., Use alloys to improve ethylene production, Petrochemical Developments, Hydrocarbon Processing, Mar. 1996, 7 pages.

RussianPatents.com, Inhibitor of acid metal corrosion, http://russianpatents.com/patent/253/2539129.html, May 21, 2015, 6 pages.

English Translation of Japanese Office Action for Japanese Patent Application No. 2016-553513 dated May 28, 2019, 3 pages.

* cited by examiner

HEAVY AMINE NEUTRALIZING AGENTS FOR OLEFIN OR STYRENE PRODUCTION

CROSS-REFERENCE TO RELATED APPLICATION

This application claims priority to U.S. Provisional Patent Application Ser. No. 62/198,497 filed on Jul. 29, 2015, the disclosure of which is incorporated herein by reference in its entirety.

FIELD OF THE INVENTION

The present invention generally relates to compositions and methods for neutralizing acidic streams in an olefin or styrene production plant. More specifically, the invention relates to neutralizing agents for dilution steam systems in the steam cracker process and their use for reducing acid corrosion, minimizing fouling and preventing product contamination.

BACKGROUND OF THE INVENTION

Dilution steam is an integral component in the process of production of ethylene, propylene and other byproducts via the pyrolysis of hydrocarbon feedstock. Dilution steam promotes the formation of desired olefins by reducing the hydrocarbon partial pressure in the pyrolysis furnace and it extends the run length of the furnace by slowing the rate of coke deposition.

After the hydrocarbon feedstock is pyrolyzed in the cracking furnace, the effluent gases must be rapidly cooled, i.e., quenched, in order to prevent the recombination of the reactive olefins into unwanted mixtures of oligomers, polymers and fused aromatic structures. During this quenching process, steam is condensed and the resultant hot water is used for heat recovery, the water condensate is cooled further to be used in the quenching process, and a portion of the condensate is processed for re-use as dilution steam.

This "steam cracking" process (pyrolysis of hydrocarbon feedstock in the presence of dilution steam) also produces a small quantity of less desirable by-products such as carbon monoxide, carbon dioxide, acetaldehyde, and acetic acid. The organic acids, acetic acid, propionic acid, formic acid, and to a lesser extent higher $C_4$-$C_6$ organic acids promote corrosion in the aqueous environment of the quench water system, the quench water cleaning vessels (e.g., oil/water separator, coalescers, process water stripper) and the dilution steam generator. Another contributor to acidic conditions in the "dilution steam system" (e.g., a system that includes the quench water system, oil/water separator, process water stripper, dilution steam generator and dilution steam piping) are sulfur-based acids, formed from cracking of sulfur compounds that come with or are added to the hydrocarbon feedstock. These acidic byproducts are neutralized with a base.

In many systems, the neutralizing agent of choice for dilution steam systems was caustic, NaOH, and this alkalizer is cost-effective provided that the dilution steam generator has sufficient size or design features that prevent the incidental carry-over of sodium ions with the dilution steam. Low levels of carry-over of sodium with the dilution steam can cause a greater degree of furnace coking and shorter furnace run length, while high levels of carry-over of sodium can destroy the mechanical properties of the furnace radiant tubes (e.g., sodium embrittlement).

To circumvent the hazards associated with sodium carry-over, a large number of ethylene producers choose to control pH in the dilution steam system with the use of neutralizing amines. Although monoethanolamine (MEA) is a cost-effective amine, it reacts with acetic acid in dilution steam condensate to form MEA-acetate salt. In an aqueous solution, this salt generates a buffered pH condition wherein a small addition of acid does not greatly decrease the pH and a small addition of base does not greatly increase the pH. Even though this buffering condition protects against pH shifts into the more corrosive acidic regime, it also requires use of large amounts of MEA to raise the pH into the protective pH range that avoids solubilization of iron oxides and thereby prevents corrosion.

Even though MEA has a relatively low volatility ratio in a steam boiler, some amine will carry over with the steam phase in the boiler. When an amine, such as MEA, goes to the pyrolysis furnace, the amine is cracked to form ammonia and hydrocarbon by-products. Ammonia is a contaminant for the ethylene product because it poisons the catalysts that are used to produce polyethylene and ethylene copolymers. When ethylene product is off-specification due to ammonia, the ethylene product is sent directly to the flaring system until the product is back on specification. Since ammonia is a base, it can raise the pH in the quench water of the dilution steam system. If the addition of the ammonia is uncontrolled, then the quench water can become too alkaline and can promote stabilized emulsions in the quench oil/water separator, causing premature fouling of the dilution steam generator.

Thus, a need for a more effective neutralizer exists.

SUMMARY OF THE INVENTION

One aspect of the invention is a method for inhibiting fouling and corrosion of equipment in an ethylene production plant. The method comprises injecting a neutralizing agent into a dilution steam system, the neutralizing agent being substantially sodium-free, and being selected from N-(2-aminoethyl)ethanolamine (AEEA), N-methyldiethylanolamine (MDEA), diethylenetriamine (DETA), triethylenetetramine (TETA), morpholinopropylamine, imidazole, hexamethylenediamine (HMDA), 2-methylpentamethylenediamine (MPMD), 1,3-diaminopentane (DAMP), or a combination thereof.

Another aspect of the invention is a method for inhibiting fouling and corrosion of equipment in a styrene production plant. The method comprises injecting a neutralizing agent into a dilution steam system, the neutralizing agent being substantially sodium-free, and being selected from N-(2-aminoethyl)ethanolamine (AEEA), N-methyldiethylanolamine (MDEA), diethylenetriamine (DETA), triethylenetetramine (TETA), morpholinopropylamine, imidazole, hexamethylenediamine (HMDA), 2-methylpentamethylenediamine (MPMD), 1,3-diaminopentane (DAMP), or a combination thereof.

Yet another aspect is a method for inhibiting fouling and corrosion of equipment in an ethylene or styrene production plant. The method comprises injecting a neutralizing agent into a dilution steam system. The neutralizing agent being substantially sodium-free, and being selected from N-(2-aminoethyl)ethanolamine (AEEA), N-methyldiethylanolamine (MDEA), diethylenetriamine (DETA), triethylenetetramine (TETA), morpholinopropylamine, imidazole, hexamethylenediamine (HMDA), 2-methylpentamethylenediamine (MPMD), 1,3-diaminopentane (DAMP), or a combination thereof. Preferably, the neutralizing agent comprises an aqueous solution of hexamethylenediamine (HMDA).

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Neutralizing agents for ethylene and styrene production plants have been discovered to effectively prevent or reduce fouling of the equipment with undesirable hydrocarbon deposits and to inhibit product contamination. Such neutralizing agents are substantially sodium-free, and are selected from N-(2-aminoethyl)ethanolamine (AEEA), N-methyldiethylanolamine (MDEA), diethylenetriamine (DETA), triethylenetetramine (TETA), morpholinopropylamine, imidazole, hexamethylenediamine (HMDA), 2-methylpentamethylenediamine (MPMD), 1,3-diaminopentane (DAMP), or a combination thereof.

The neutralizating agents of the invention have a relatively high pKa that allows the neutralizing agent to be effective at increasing the pH of the aqueous solution in the dilution steam system while minimizing the amount of neutralizing agent needed. In selecting a neutralizing agent with a high pKa, once the acids are stoichiometrically neutralized, only a small excess of the high pKa neutralizer is needed to increase the pH of the boiler water. The high pKa of the neutralizing agent helps to reduce the level of treatment needed in the waste water system since it allows for a smaller amount of the neutralizing agent to be used.

Due to the low volatility of the neutralizing agent, it is less likely that the neutralizing agent will go with the steam phase in the boiler. Since the neutralizing agent is less likely to be in the steam phase, the neutralizing agent is also less likely to reach the pyrolysis furnace. When an amine used as a neutralizing agent enters the pyrolysis furnace, it is cracked to form ammonia and hydrocarbons. The ammonia is a contaminant in the ethylene product because it poisons the polymerization catalysts. Ammonia can also increase the pH of the quench water, but when the ammonia addition is uncontrolled, the quench water can reach a pH that is too high and emulsions can form that impede the separation of the oil and water. The low volatility of the neutralizing agent avoids formation of these emulsions which can cause fouling of the dilution steam generator.

The neutralizing agent is sodium-free or substantially sodium-free so that carry over of sodium ions into the furnace does not occur or is minimal. Such carry over can cause furnace coking, shorter furnace run length, or sodium embrittlement of the furnace radiant tubes. The sodium embrittlement makes the radiant tubes become like glass and significantly reduces the useful life of the furnace radiant tubes. A neutralizing agent is "substantially sodium-free" if the neutralizing agent or a composition comprising the neutralizing agent contains an amount of sodium that does not result in furnace coking or result in sodium embrittlement in any component of the dilution steam system. Preferably, the neutralizing agent is sodium-free.

A method of the invention inhibits fouling and corrosion of equipment in an ethylene production plant and comprises injecting a neutralizing agent into a dilution steam system, the neutralizing agent having a volatility index of less than 0.005 and the neutralizing agent being substantially sodium-free, and being selected from N-(2-aminoethyl)ethanolamine (AEEA), N-methyldiethylanolamine (MDEA), diethylenetriamine (DETA), triethylenetetramine (TETA), morpholinopropylamine, imidazole, hexamethylenediamine (HMDA), 2-methylpentamethylenediamine (MPMD), 1,3-diaminopentane (DAMP), or a combination thereof.

The invention is further directed to a method for inhibiting fouling and corrosion of equipment in an ethylene production plant, the method comprising injecting a neutralizing agent into a dilution steam system, the neutralizing agent comprising an aqueous solution of HMDA.

The process of cracking a hydrocarbon feed produces the desired olefins, primarily $C_2$-$C_4$ olefins such as ethylene, propylene, butylene, and butadiene. The cracking process also produces by-products such as carbon monoxide, carbon dioxide, acetaldehyde, and organic acids such as acetic acid, propionic acid, formic acid and some $C_4$ to $C_6$ organic acids. Also, some sulfur-based acids are products of the cracking of sulfur compounds contained in the hydrocarbon feed. Addition of the neutralizing agent into the dilution steam system reduces damage to the system that can be caused by the presence of some of these by-products as described in more detail above.

Figure 1:
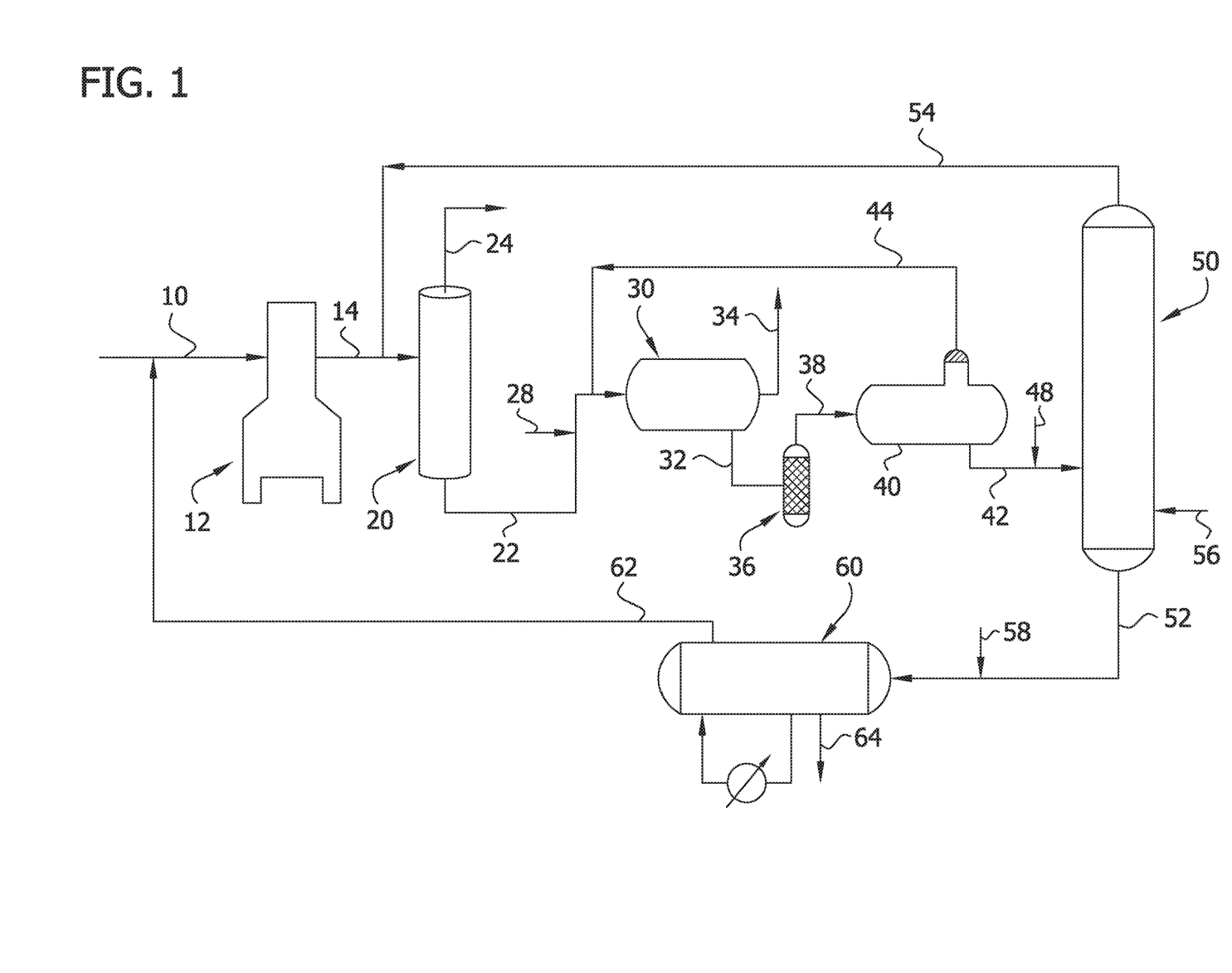
FIG. 1 is a schematic of an olefin dilution steam system.

The dilution steam system used in the methods described herein can comprise a furnace, a quench water tower, a quench water separator, a coalescer, a process water stripper, and a dilution steam generator. A representative dilution steam system for ethylene production is shown in FIG. 1, in which a hydrocarbon feedstock 10 is fed into a pyrolysis furnace 12 and the effluent from the pyrolysis furnace contained in an effluent line 14 is fed to a quench water tower 20. The quench water tower 20 reduces the temperature of the gases in the overhead line 24 by spraying cool water from the top of the quench water tower 20. This process recovers energy, reduces undesirable side reactions, and condenses a fraction of the pyrolysis gas. The quench water tower bottoms are contained in a quench water tower line 22 and are sent to the quench water separator 30. The quench water separator 30 separates hydrocarbons from water and is the first step in cleaning the water exiting the quench water tower. Light hydrocarbons are contained in a light hydrocarbons line 34 and are separated from the water contained in the quench water separator line 32 that is sent to the coalescer unit comprising filters 36 and a coalescer 40. The coalescer unit further improves the quality of the process water by removing organic and solid materials by using the filters 36 to recover solids and the coalescer 40 to reduce hydrocarbons. The water contained in the quench water separator line 32 from the quench water separator 30 is first sent to the filters 36 of the coalescer unit and after filtering the water contained in the filter line 38 is sent to the coalescer 40. The coalescer 40 separates light oils from water. The light oils contained in the light oil line 44 from the coalescer are sent to the quench water separator 30 and the water from the coalescer contained in the coalescer line 42 is sent to the process water stripper 50. The process water stripper 50 purifies the process water by removing hydrogen sulfide, carbon dioxide, ammonia, and light hydrocarbons.

The gases contained in the gas line 54 are typically sent to the quench water tower 20 and the bottoms contained in the process water stripper line 52 from the process water stripper 50 are sent to the dilution steam generator 60. Dilution steam makeup 56 can be added to the process water stripper 50 as needed. The dilution steam generator 60 generates dilution steam using quench oil or medium pressure steam. The steam drum in the dilution steam generator 60 contains a demister pad to eliminate carry over of impurities and the impurities are purged via the blow down 64. The treated dilution steam 62 is directed to the feed line 10 to recycle dilution steam back into the pyrolysis furnace 12.

The neutralizing agent can be injected at one or more points within the dilution steam system for ethylene production. The neutralizing agent can be injected into the process water stripper line between the process water stripper and the dilution steam generator at a concentration to keep the aqueous solution in the dilution steam generator at a pH between about 9 and about 12, preferably between about 9.5 and about 10.5, thereby reducing corrosion or fouling of the dilution steam generator. For example in FIG. 1, an injection of the neutralizing agent into a dilution steam generator injection point 58 into the process water stripper line 52 can be made to maintain the pH of the aqueous solution in the dilution steam generator 60 at between about 9 and about 12, preferably between about 9.5 and about 10.5.

The neutralizing agent can be injected into the quench water tower line between the quench water tower and the quench water separator at a concentration to keep the aqueous solution in the quench water separator at a pH between about 5.5 and 7.5, thereby reducing corrosion of the quench water separator. For example in FIG. 1, an injection of the neutralizing agent at a quench water separator point 28 into the quench water tower line 22 can be made to provide the aqueous solution in the quench water separator 30 with a pH between about 5.5 and about 7.5.

The neutralizing agent can be injected into the quench water separator line between the coalescer and the process water stripper at a concentration to keep the aqueous solution in the process water stripper at a pH between about 8 and 9, thereby reducing corrosion or fouling of the process water stripper, and reducing ammonia contamination of the vapor exiting the process water stripper by using an amine having a lower volatility to keep the amine out of the vapor stream. For example in FIG. 1, an injection of the neutralizing agent at a process water stripper injection point 48 into the coalescer line 42 can be made to maintain the aqueous solution in the process water stripper 50 at a pH between about 8 and about 9.

Another aspect of the invention is a method for inhibiting fouling and corrosion of equipment in an ethylene production plant. The method comprises injecting a neutralizing agent comprising a solution of N-(2-aminoethyl)ethanolamine (AEEA), N-methyldiethanolamine (MDEA), diethylenetriamine (DETA), triethylenetetramine (TETA), morpholinopropylamine, imidazole, hexamethylenediamine (HMDA), 2-methylpentamethylenediamine (MPMD), 1,3-diaminopentane (DAMP), or a combination thereof into a dilution steam system. Preferably, the neutralizing agent comprises an aqueous solution of HMDA.

The dilution steam system comprises a furnace, a quench water tower, a quench water separator, a coalescer, a process water stripper, and a dilution steam generator and the neutralizing agent is injected (i) into a process water stripper line between the process water stripper and the dilution steam generator at a concentration to keep the aqueous solution in the dilution steam generator blowdown at a pH between about 9 and about 12, thereby reducing corrosion or fouling of the dilution steam generator; (ii) into a quench water tower line between the quench water tower and the quench water separator at a concentration to keep the aqueous solution in the quench water separator at a pH between about 5.5 and 7.5, thereby reducing corrosion of the quench water separator; and (iii) into a coalescer line between the coalescer and the process water stripper at a concentration to keep the aqueous solution in the process water stripper bottom discharge at a pH between about 8 and 9, thereby reducing corrosion or fouling of the process water stripper, and reducing ammonia contamination of the vapor exiting the process water stripper.

A method of the invention inhibits fouling and corrosion of equipment in a styrene production plant and comprises injecting a neutralizing agent into a dilution steam system, the neutralizing agent having a volatility index of less than 0.005 and a pKa of about 10 to about 15, and being substantially sodium-free.

A method for inhibiting fouling and corrosion of equipment in a styrene production plant, the method comprising injecting a neutralizing agent into a dilution steam system, the neutralizing agent comprising an aqueous solution of HMDA.

Figure 2:
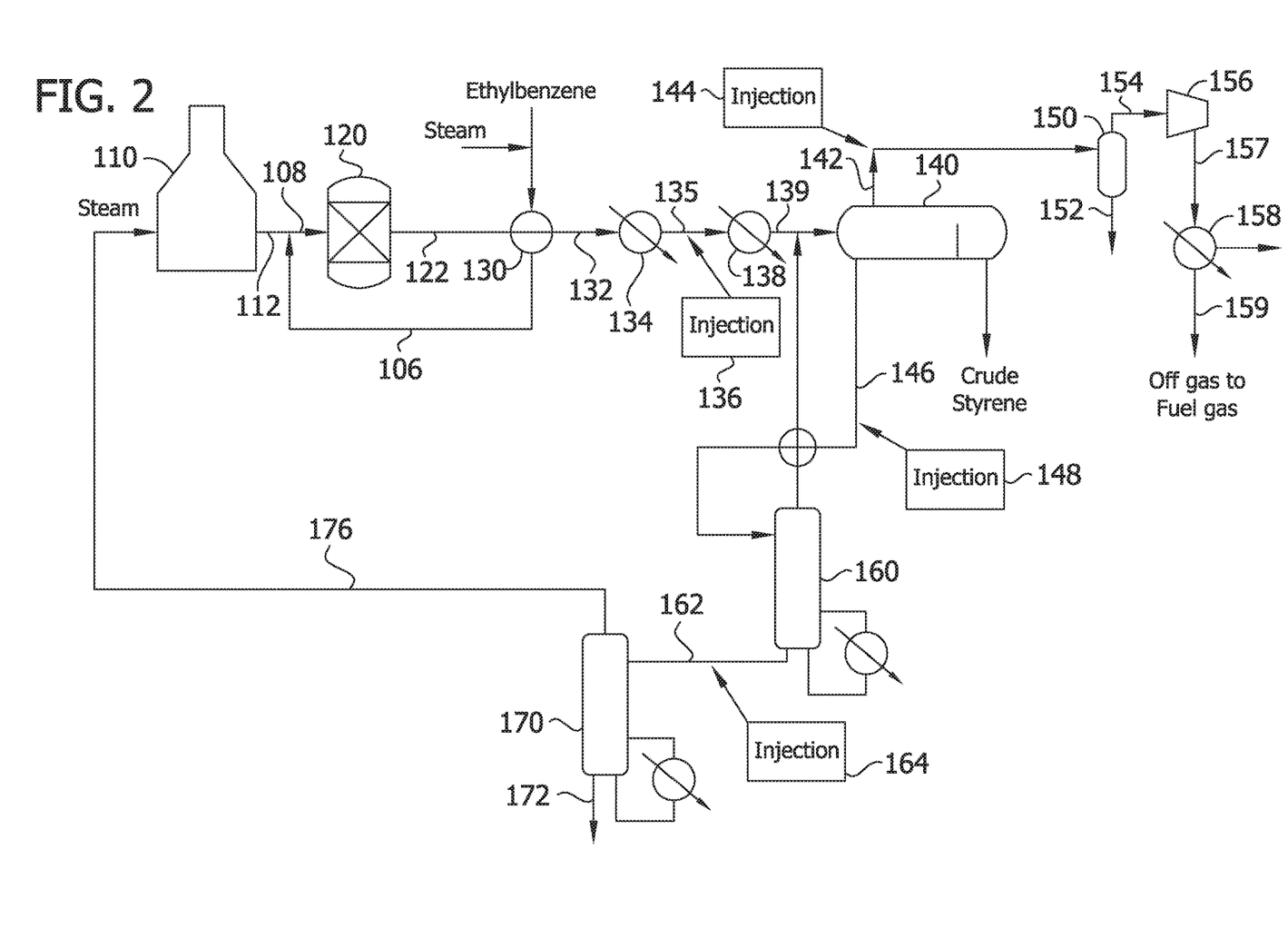
FIG. 2 is a schematic of a styrene dilution steam system.
Figure 3:
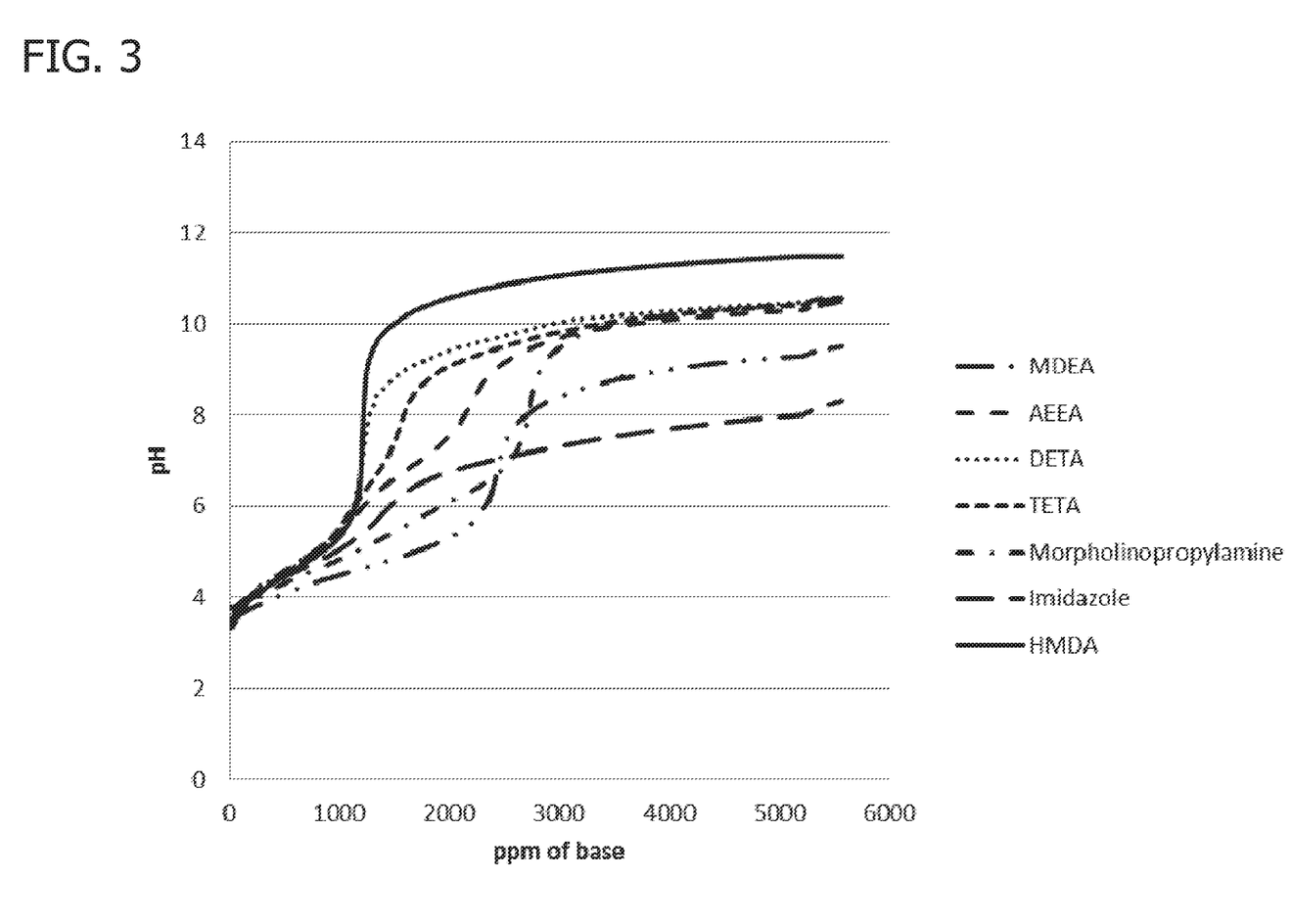
FIG. 3 is a graph of pH versus the concentration of the base for N-(2-aminoethyl)ethanolamine (AEEA), N-methyldiethylanolamine (MDEA), diethylenetriamine (DETA), triethylenetetramine (TETA), morpholinopropylamin, imidazole, and hexamethylenediamine (HMDA).

A representative dilution steam system for styrene production is shown in FIG. 2, in which an ethyl benzene feedstock in a feed line 106 is mixed with superheated steam from a superheater line 112 and fed via line 108 to a reactor 120 and reacted. The effluent from the reactor contained in a reactor line 122 is directed to a series of heat exchangers (e.g., heat exchanger 130, heat exchanger 134, and heat exchanger 138) to cool and condense the reactor effluent. The contents of heat exchanger 130 are directed to heat exchanger 134 through heat exchanger line 132, the contents of heat exchanger 134 are directed to heat exchanger 138 through the heat exchanger line 135. The contents of heat exchanger 138 are transferred through the heat exchanger line 139 to the separator 140, which separates vent gas from condensate and crude styrene. The vent gas from the separator 140 is directed through the vent gas line 142 to a gas/liquid separator 150 and the vent gas from the vent gas condenser is directed through a vent gas condenser line 154 to a vent gas compressor 156. The compressed vent gas is directed through a compressor line 157 to a compressor heat exchanger 158 and sent as an off gas through the off gas line 159.

The condensate from the separator 140 is directed through the separator line 146 to the process water stripper 160. The process water stripper bottoms are directed through a process water stripper line 162 to a dilution steam generator 170. The steam from the dilution steam generator 170 can be directed through a dilution steam generator line 176 to a superheater 110. Impurities in the dilution steam generator can be released through the blow down 172. The steam released from the superheater 110 is directed through a superheater line 112 into the reactor 120 to react with the ethyl benzene.

The neutralizing agent can be injected at one or more points within the dilution steam system for styrene production. A neutralizing agent can be injected into a heat exchanger line between two heat exchangers at a concentration to keep the condensate from the separator at a pH between about 6.5 and about 7.5, thereby reducing corrosion or fouling of the heat exchanger or separator. For example in FIG. 2, an injection of neutralizing agent can be made into the heat exchanger line 135 at heat exchanger injection point 136 to maintain the aqueous solution in the separator 140 at a pH between about 6.5 and about 7.5.

Further, a neutralizing agent can be injected into a vent gas line between the separator and the vent gas condenser at a concentration to keep vent gas condenser condensate at a pH between about 6.5 and 7.5, thereby reducing corrosion of the vent gas compressor. For example in FIG. 2, a neutralizing agent can be injected into the vent gas line 142 at vent gas injection point 144 to maintain the pH of the condensate 152 in the vent gas condenser 150 at a pH between about 6.5 and 7.5.

Additionally, a neutralizing agent can be injected into a separator line between the separator and the process water stripper at a concentration to keep the aqueous solution in the process water stripper bottoms at a pH between about 8.8 and 9.2, thereby reducing corrosion or fouling of the process water stripper, and reducing ammonia contamination of the vapor exiting the process water stripper due to the use of an amine having a lower volatility. For example in FIG. 2, a neutralizing agent can be injected into the separator line 146 at a separator line injection point 148 to maintain the pH of the aqueous solution in the process water stripper 160 is from about 8.8 to about 9.2.

Also, a neutralizing agent can be injected into a process water stripper line between the process water stripper and the dilution steam generator at a concentration to keep the dilution steam generator blow down at a pH between about 9.5 and 10.5, thereby reducing corrosion of the dilution steam generator. For example in FIG. 2, an injection of the neutralizing agent can be made into the process water stripper line 162 at a process water stripper injection point 164 to maintain the pH of the aqueous solution in the dilution steam generator 170 at a pH from about 9.5 to about 10.5.

Another aspect of the invention is a method for inhibiting fouling and corrosion of equipment in a styrene production plant. The method comprises injecting a neutralizing agent into a dilution steam system, wherein the dilution steam system comprises a super heater, a reactor, a plurality of heat exchangers, a separator, a vent gas condenser, a vent gas compressor, a process water stripper, and a dilution steam generator and wherein the neutralizing agent is injected (i) into a heat exchanger line between two heat exchangers at a concentration to keep the condensate from the separator at a pH between about 6.5 and about 7.5, thereby reducing corrosion or fouling of the heat exchanger or separator; (ii) into a vent gas line between the separator and the vent gas condenser at a concentration to keep vent gas condenser condensate at a pH between about 6.5 and 7.5, thereby reducing corrosion of the vent gas compressor; (iii) into a separator line between the separator and the process water stripper at a concentration to keep the aqueous solution in the process water stripper bottoms at a pH between about 8.8 and 9.2, thereby reducing corrosion or fouling of the process water stripper, and reducing ammonia contamination of the vapor exiting the process water stripper due to the use of an amine having a lower volatility; and (iv) into a process water stripper line between the process water stripper and the dilution steam generator at a concentration to keep the dilution steam generator blow down at a pH between about 9 and about 12, preferably between about 9.5 and about 10.5, thereby reducing corrosion of the dilution steam generator.

The relationship between corrosion control and operating pH is straight forward: acidic pH conditions are corrosive, while alkaline conditions cause less corrosion. The relationship between pH control and fouling is not as straightforward. For the ethylene cracking process, high pH in the quench water tower and oil/water separator increases the formation of stable hydrocarbon/water emulsions. The composition of pyrolysis gasoline can contain numerous reactive olefins and diolefins that are prone to polymerization reactions. The process conditions and reactants in the process water stripper can promote polymerization while solvent removal from emulsions not resolved in the oil/water separator takes place. In turn, this polymer production and solvent removal can lead to foulant (e.g., hydrocarbon polymers) deposition in the bottom of the process water stripper and in the dilution steam generator.

When traditional amines, most often alkanolamines, are used as steam dilution system neutralizing agents, the initial control of quench water pH poses no problems. However, during and after this initial period of operation, a small amount of amine can travel with the dilution steam and can be pyrolyzed in the furnace, thus generating ammonia. Since ammonia is a volatile alkalizing agent, when formed, it accumulates in the quench water tower and in the oil/water separator. This ammonia accumulation causes the quench water pH to rise above the desired pH set point and the elevated pH promotes the formation of stable emulsions. When the ammonia accumulation exceeds the saturation limits of the quench water system, the ammonia can travel with the cracked gas towards the purification system. The ammonia distills with the ethylene fraction and can contaminate the final product. Thus, providing controls for the ammonia produced in the ethylene process is advantageous.

The volatility index (or V/L ratio) of the neutralizing agent is the measure of the partition of the neutralizing agent between the vapor and liquid state at a particular pressure. The volatility index is determined by operating a small boiler unit. The boiler is charged with de-ionized water and a measured amount of the neutralizing agent is added to the water. The boiler is heated to a specified pressure and when steady-state at that pressure is achieved, a sample of steam is condensed and collected and simultaneously a sample of the boiler water is collected. The two water samples are then analyzed for the neutralizing agent concentration. The volatility index is then calculated by dividing the concentration of the neutralizing agent in the steam by the concentration of the neutralizing agent in the water. Then, the boiler is heated further to the next desired pressure and when steady-state is achieved, another set of samples is collected.

The neutralizing agent can comprise N-(2-aminoethyl) ethanolamine (AEEA), N-methyldiethylanolamine (MDEA), diethylenetriamine (DETA), triethylenetetramine (TETA), morpholinopropylamine, imidazole, hexamethylenediamine (HMDA), 2-methylpentamethylenediamine (MPMD), 1,3-diaminopentane (DAMP), or a combination thereof.

The neutralizing agent can comprise N-(2-aminoethyl) ethanolamine (AEEA).

The neutralizing agent can comprise N-methyldiethylanolamine (MDEA).

The neutralizing agent can comprise diethylenetriamine (DETA).

The neutralizing agent can comprise triethylenetetramine (TETA).

The neutralizing agent can comprise morpholinopropylamine.

The neutralizing agent can comprise imidazole.

The neutralizing agent can comprise 2-methylpentamethylenediamine (MPMD).

The neutralizing agent can comprise 1,3-diaminopentane (DAMP).

Preferably, the neutralizing agent comprises hexamethylenediamine (HMDA).

When the neutralizing agent is hexamethylenediamine it can be prepared from the pure solid as an aqueous solution. When it is prepared in this manner, the concentration of the neutralizing agent in the aqueous solution ranges from 50 wt. % to 100 wt. % amine in water, preferably 60 wt. % amine in water.

The solvent in the neutralizing agent composition can comprise water.

When the neutralizing agent comprises HMDA, the solvent in the neutralizing agent composition can comprise water.

The neutralizing agent could be a blend of HMDA and MPMD.

The neutralizing agent could also be a bend of HMDA and MPMD where the concentration range of amine blend would be 50 wt. % to 80 wt. % in water.

In operational practice, an ethylene plant is a dynamic process with minor shifts in feedstock composition, process flow rates, temperature fluctuations, and other process conditions and as a result, the concentration of acids to be neutralized can vary slightly. The preferred neutralizing agent of this invention is additionally advantageous because the relationship between the pH of the solution and the concentration of neutralizing agent used (i.e., the neutralization profile) goes from a nearly vertical rise in pH at pHs of 9 and below to a less steep pH rise when concentration of the neutralizing agent keeps the solution between pH 9 to 12, preferably, between pH 9.5 to 10.5. This pH target of 9 to 12, preferably, pH 9.5 to 10.5 is sought in the dilution steam generator, where corrosion is the greatest concern. This neutralizing profile for the neutralizing agent described herein means that less of the neutralizing agent is needed to maintain the solution it is used to neutralize (e.g., dilution steam) at the desired pH.

The neutralizing agent can be injected into the system in a variety of ways known to a person of skill in the art. The injection control may be a microprocessor, a central process unit, or any other similar device capable of processing the signal output from the acid measurement device and controlling the rate of dispensation of the neutralizing agent in response to this signal. The injection control may be integral with the neutralizing agent injector or it may be separate. Suitable injection controllers would include control systems that are well known in the art.

The acid concentration detector may be any one of a number of devices capable of generating a signal responsive to the concentration of acid in the dilution steam system. Automated titrators are particularly effective acid measuring devices. A number of automated titrators suitable for use in the system are commercially available including those from Rosemount Inc., Honeywell, Hach, or Mettler Toledo.

Having described the invention in detail, it will be apparent that modifications and variations are possible without departing from the scope of the invention defined in the appended claims.

EXAMPLES

The following non-limiting examples are provided to further illustrate the present invention.

Example 1

Titration of 1300 ppm of Acetic Acid with N-(2-aminoethyl)ethanolamine (AEEA)

To test the comparative neutralization efficacy of AEEA as a neutralizer, the solution was initially diluted according to the following procedure. Into a glass container was added 10.0 g of neat AEEA. This was diluted to a total mass of 500 g using distilled water.

A solution of 1300 ppm acetic acid was prepared by adding 1.31 mL of 99.7% (purity) glacial acetic acid to a 1000 mL volumetric flask. To this flask was added deionized water to give 1000 mL of final solution. A 30 mL aliquot of this solution was added to a 100 mL titration vial. Using a pH meter, the initial pH of the solution was measured. Thereafter, the dilution solution of neat MEA was added to the vial in small aliquots at a time while the pH of the solution was measured at every point. The titration was continued until 30 mL of the neutralizer was used. At the end of the titration the pH had reached 10.5 and 8156 ppm of neutralizer was used.

Example 2

Titration of 1300 ppm of Acetic Acid with N-methyldiethanolamine (MDEA)

In the second example of comparative neutralization, 5 g of MDEA was initially diluted prior to titration with 1300 ppm acetic acid according to the procedure in Example 1. At the end of the titration the pH had reached 9.69 and 10877 ppm of neutralizer was used.

Example 3

Titration of 1300 ppm of Acetic Acid with Diethylenetriamine (DETA)

In the third example of comparative neutralization, 10.02 g of DETA was initially diluted prior to titration with 1300 ppm acetic acid according to the procedure in Example 1. At the end of the titration the pH had reached 10.5 and 5789 ppm of neutralizer was used.

Example 4

Titration of 1300 ppm of Acetic Acid with Triethylenetetramine (TETA)

In the forth example of comparative neutralization, 5.02 g of TETA was initially diluted prior to titration with 1300 ppm acetic acid according to the procedure in Example 1. At the end of the titration the pH had reached 11.0 and 8556 ppm of neutralizer was used.

Example 5

Titration of 1300 ppm of Acetic Acid with Morpholinopropylamine

In the fifth example of comparative neutralization, 10.04 g of morpholinopropylamine was initially diluted prior to titration with 1300 ppm acetic acid according to the procedure in Example 1. At the end of the titration the pH had reached 10.5 and 6984 ppm of neutralizer was used.

Example 6

Titration of 1300 ppm of Acetic Acid with Imidazole

In the sixth example of comparative neutralization, 10.02 g of imidazole was initially diluted prior to titration with 1300 ppm acetic acid according to the procedure in Example 1. At the end of the titration the pH had reached 8.531 and 12796 ppm of neutralizer was used.

Example 7

Titration of 1300 ppm of Acetic Acid with Hexamethylenediamine (HMDA)

In the seventh example of comparative neutralization, 5.08 g of HMDA was initially diluted prior to titration with 1300 ppm acetic acid according to the procedure in Example 1. At the end of the titration the pH had reached 11.5 and 5367 ppm of neutralizer was used.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A method for inhibiting fouling and corrosion of equipment in an ethylene production plant, the method comprising injecting a neutralizing agent into a dilution steam system of a steam cracker process, the neutralizing agent being substantially sodium-free, and being selected from the group consisting of diethylenetriamine (DETA), triethylenetetramine (TETA), morpholinopropylamine, hexamethylenediamine (HMDA), 2-methylpentamethylenediamine (MPMD), 1,3-diaminopentane (DAMP), and a combination thereof and wherein the dilution steam system of the ethylene production plant comprises a furnace, a quench water tower, a quench water separator, a coalescer, a process water stripper, and a dilution steam generator and wherein the neutralizing agent is injected into a quench water tower line between the quench water tower and the quench water separator at a concentration to keep an aqueous solution in the quench water separator at a pH between about 5.5 and 7.5, thereby reducing corrosion of the quench water separator.

2. The method of claim 1, wherein the neutralizing agent is diethylenetriamine (DETA).

3. The method of claim 1, wherein the neutralizing agent is triethylenetetramine (TETA).

4. The method of claim 1, wherein the neutralizing agent is morpholinopropylamine.

5. The method of claim 1, wherein the neutralizing agent is 2-methylpentamethylenediamine (MPMD).

6. The method of claim 1, wherein the neutralizing agent is 1,3-diaminopentane (DAMP).

7. The method of claim 1, wherein the neutralizing agent is hexamethylenediamine.

8. The method of claim 1 wherein the neutralizing agent is further injected into a process water stripper line between the process water stripper and the dilution steam generator at a concentration to keep an aqueous solution in the dilution steam generator at a pH between about 9.5 and about 10.5, thereby reducing corrosion or fouling of the dilution steam generator.

9. The method of claim 8 wherein the neutralizing agent is injected into a coalescer line between the coalescer and the process water stripper at a concentration to keep an aqueous solution in the process water stripper at a pH between about 8 and 9, thereby reducing corrosion or fouling of the process water stripper, and reducing ammonia contamination of the vapor exiting the process water stripper.

10. The method of claim 1, wherein the neutralizing agent consists essentially of hexamethylenediamine (HMDA).

* * * * *

UNITED STATES PATENT AND TRADEMARK OFFICE
CERTIFICATE OF CORRECTION

| | |
|---|---|
| PATENT NO. | : 11,492,277 B2 |
| APPLICATION NO. | : 15/222404 |
| DATED | : November 8, 2022 |
| INVENTOR(S) | : Theodore C. Arnst et al. |

It is certified that error appears in the above-identified patent and that said Letters Patent is hereby corrected as shown below:

On the Title Page

Column 2, Item (56), under U.S. Patent Documents:

Delete "1,082,784" and insert -- 4,082,764 --.

Delete "1,217,218" and insert -- 4,217,218 --.

Delete "1,229,284" and insert -- 4,229,284 --.

Signed and Sealed this
Second Day of May, 2023

Katherine Kelly Vidal
*Director of the United States Patent and Trademark Office*